3,268,347
PROTECTIVE COATING MATERIALS FOR SHIP BOTTOM

Masao Nagasawa, Shimizu, Japan, assignor to Ihara Noyaku Kabushiki Kaisha, Shimizu, Japan, a corporation of Japan
No Drawing. Filed Jan. 14, 1963, Ser. No. 251,050
1 Claim. (Cl. 106—15)

This invention relates to a novel compound consisting of organic tin salts of 2,5-dimercapto-1,3,4-thiadiazole and an anti-fouling and anti-microorganismic paint containing as essential ingredient said novel compound and also a method of manufacturing said compound.

The principal object of the invention is to produce a novel compound which has combatting nature against microorganisms and accordingly anti-fouling nature.

Another object of the invention is to provide a good anti-fouling paint by using the above novel compound, more particularly effective for preventing the ship body from the attack due to harmful marine organisms and corrosion of sea water.

A further object of the invention is to provide non-deteriorating, long lasting and anti-microorganismic paint to be applied for the protection of metals and other articles.

In order to prevent the deposit of marine living organisms on the ship bottom, it has heretofore been usual to employ inorganic compounds of heavy metals including copper or mercury as a poisonous component, but such compounds have disadvantages that recently ships are being built of light metal alloys such as aluminum, magnesium so that the coating materials consisting of an inorganic compound of heavy metal such as copper or mercury etc. tend to corrode catalytically structural material of ship bottoms and that furthermore owing to recent remarkable development of chemical industry, industrial waste water flows in a harbor where sulfides dissolved in the dirty water react with the heavy metals such as copper or mercury contained in the coating material, thereby causing decoloration or degradation of the coated material to lose protective effect. Moreover, it has been known that the color tone of the coating layer influences substantially the protective effect so that conventional coating materials for ship bottoms have been limited to dark red-brown tone resulting from copper protoxide.

The inventors have found that the above described disadvantages can be obviated by a novel organic tin salts of 2,5-dimercapto-thiadiazole having a general formula

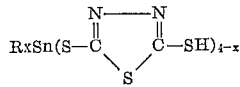

wherein $x$ is 1 and 2; R represents an alkyl, alkenyl, aryl, or aralkyl group, and that such salts can satisfy the conditions necessary for the protective coating material of ship bottom. Accordingly the compound of the invention is characterized in that it does not cause decoloration and degradation resulting better coating layer and can be easily coated as it has less toxicity and unpleasant odor in comparison with conventional organic tin compounds and furthermore it has an excellent effect for preventing the deposition of noxious organisms with a small quantity for a long period.

Preparations of the typical compounds to be used for the coating material of the invention are explained as follows:

Example 1

Production of S-tri-n-butyl tin 2,5-dimercapto-1,3,4-thiadiazole

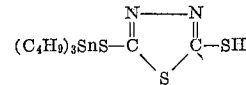

To a one-liter round bottomed flask having four necks each equipped with an agitator, a thermometer, a dropping funnel and a reflux condenser respectively were delivered 400 ml. of water, in which 60 g. of 2,5-dimercapto-1,3,4-thiadiazole were suspended and 65 g. of tri-n-butyl tin chloride were added dropwise to the suspension while stirring vigorously. After the addition, the mixture was heated on hot water bath for about 2 hours while agitating. The hot reaction mixture was filtered by suction through the layer of active carbon and then the filtrate was cooled, and the resulting crystals were filtered off and the residue was decolorized and recrystallized from water to obtain light yellow colored prismatic crystals having melting point of 52–55° C. and the yield was 89% of the theoretical amount. The product was difficult to dissolve in water and easily soluble in acetone, alcohol and benzene.

Example 2

Production of S-di-n-butyl tin bis(2,5-dimercapto-1,3,4-thiadiazole)

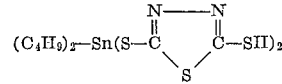

2,5-dimercapto-1,3,4-thiadiazole dissolved in 250 ml. of ethanol was introduced into three necked flask equipped with a reflux condenser, an agitator and a dropping funnel respectively, to which 25.4 g. of caustic soda dissolved in 100 ml. of ethanol were added. To the mixture were added dropwise 68.6 g. of dibutyl tin dichloride dissolved in 120 ml. of ethanol while heating and stirring for about one hour. After addition, the reaction mixture was heated continuously and stirred further for 4 hours and then after cooling the mixture was filtered off. The resulting white crystals were washed with ethanol and then with water, dried to obtain white crystals having melting point 176° C., which are difficulty soluble in water, alcohol or acetone, and the yield was 82% of the theoretical amount.

Example 3

Production of S-diphenyl tin·bis(2,5-dimercapto-1,3,4-thiadiazole)

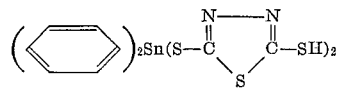

To a one-liter round bottomed flask equipped with stirrer, a thermometer, a dropping funnel and a reflux condenser respectively were introduced 300 ml. of ethanol and 30 g. of 2,5-dimercapto-1,3,4-thiadiazole, then 200 ml. of caustic potash solution (contained 12 g. KOH) fed into the flask. To the suspension was added dropwise a solution of 34.4 g. of diphenyl tin dichloride in 100 ml.

of ethanol while stirring vigorously and the mixture was refluxed for 4 hours, and then reaction mixture was filtered, the filtrate was concentrated under a reduced pressure to obtain an oil residue, which crystallized by cooling and then was dissolved in benzene. The solution was filtered and the filtrate was concentrtaed and recrystallized to obtain 90 g. of light yellow columnar crystals having melting point 176° C. and the yield was 80% of the theoretical amount.

By the similar methods to the above described examples the following compounds may be produced:

S-triphenyl tin-2,5-dimercapto-1,3,4-thiadiazole
S-tribenzyl tin-2,5-dimercapto-1,3,4-thiadiazole
S-trivinyl tin-2,5-dimercapto-1,3,4-thiadiazole
S-diethyl-n-octyl tin-2,5-dimercapto-1,3,4-thiadiazole These organic tin compounds have a considerably slow rate of hydrolysis so that they maintain the effects in sea water for a considerably long period and furthermore are stable chemically and do not react with components of the coating material and can compose with a wide range of substances, and do not cause deterioration after a long period and moreover they do not corrode ships, particularly ships made of light alloys so that neither decoloration nor inactivation occur due to waste water in chemical industry area. Furthermore these compounds have a low vapour pressure, a considerably less unpleasant odor which is common to organic tin compounds and less toxicity to human body, so that in operation for preparing the coating material and coating there is no danger due to inhaling poison but the treatment is easy. The organic tin compounds contained in the coating material according to the invention have very high affinity to oil than that of a poisonous substance of conventional inorganic coper and mercury series and suitable specific gravity, so that the preparation of the coating material is not only easy but also the active component does not precipitate, thereby facilitatiing easy coating operation.

Now the examples for the preparation of oily paints of the invention and examples for testing the effect are illustrated but it should be noted that kinds and quantities of addition agents and compounds may be changed for a wide range.

EXAMPLE 1

*Preparation of the oily antifouling paint having red rusty color*

| | Percent |
|---|---|
| S-tri-n-butyl tin 2,5-dimercapto-1,3,4-thiadiazole | 20.0 |
| Rouge | 15.0 |
| Talc | 7.0 |
| Aluminum stearate | 0.5 |
| Graphite | 0.5 |
| Rosin | 27.0 |
| Boiled oil | 12.0 |
| Solvent naphtha | 18.0 |
| Total | 100.0 |

EXAMPLE 2

*Preparation of oily antifouling paint having sulfur green color*

| | Percent |
|---|---|
| S-triphenyl tin-2,5-dimercapto-1,3,4-thiadiazole | 20.0 |
| Chrome yellow | 13.0 |
| Shanin green | 2.0 |
| Prussian blue | 0.5 |
| Talc | 5.0 |
| Aluminum stearate | 1.0 |
| Rosin | 26.0 |
| Boiled oil | 11.0 |
| Solvent naphtha | 21.5 |
| Total | 100.0 |

EXAMPLE 3

*Preparation of vinyl antifouling paint having emerald green color*

| | Percent |
|---|---|
| S - diphenyl tin bis(2,5 - dimercapto-1,3,4-thiadiazole | 20.0 |
| Titanium white | 8.0 |
| Chrome yellow | 6.0 |
| Shanin green | 3.0 |
| Vinyl resin | 7.5 |
| Rosin | 9.0 |
| Methyl isobutyl tin | 25.0 |
| Xylene | 21.2 |
| Tricresyl phosphate | 0.3 |
| Total | 100.0 |

Method for testing the effect of the compounds according to this invention as the antifouling paint and the results thereof are shown as follows:

A. TESTING METHOD

1. *Preparation of the paint to be tested*

The preparation was carried out according to the aforesaid examples and the resulting coating was ground and thoroughly mixed in a pot mill.

2. *Preparation of a plate to be tested*

Polished steel plates of 300 x 100 x 1 mm. were coated with the coating materials prepared in the above examples by means of brush according to the following manner and then secured to wooden frames to produce dipping samples in sea water.

3. *Coating specification*

Washing primer _____ 1 time.
No. 1 coating material for ship bottom _____ 2 times.
The coating material of the invention _ 2 times (1 coating each day).

4. *Method of dipping*

The test plates prepared as above described were dipped in a depth of 1.5 m. below sea level for the following intervals:

Start of the dipping _____ May 10, 1960.
End of the dipping _____ March 10, 1961.

B. THE RESULTS

The test plates dipped into sea water were inspected by areas deposited by organisms at an interval of every 2 months, which percentages are shown as follows:

| | 2 Months | 4 Months | 6 Months | 8 Months | 10 Months |
|---|---|---|---|---|---|
| S-tri-n-butyl tin 2,5-dimercapto-1,3,4-thiadiazole, percent | 0 | 0 (one) | 0 (two) | 1 | 1 |
| S-triphenyl tin-2,5-dimercapto-1,3-4-thiadiazole, percent | 0 | 0 | 0 | 0 | 2 |
| S-di-n-butyl tin-bis(2,5-dimercapto-1,3,4-thiadiazole, percent | 0 | 0 | 1 | 2 | 4 |
| Untreated, percent | 100 | 100 | 100 | 100 | 100 |

As apparent from the above table, it appeared that even in the case of dipping for 10 months deposition of shells and growth of seaweeds can be sufficiently prevented and the coated surface maintained still a favorable condition.

What I claim is:

A nonaqueous organic base anti-microorganismic paint and anti-fouling paint, more particularly paints for protecting ship bottoms which comprises as an anti-microorganismic and anti-fouling ingredient a minor proportion of organic tin salts of 2,5-dimercapto-1,3,4-thiadiazole having the general formula

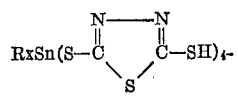

wherein $x$ is 1 and 2; R represents a hydrocarbon group selected from the group consisting of an alkyl, alkenyl, aryl and aralkyl group.

References Cited by the Examiner

UNITED STATES PATENTS

| | | | |
|---|---|---|---|
| 2,602,085 | 7/1952 | Ruskin | 260—239.95 |
| 2,703,784 | 3/1955 | Fields | 106—14 XR |
| 2,827,457 | 3/1958 | Slack et al. | 260—239.95 |
| 2,951,766 | 9/1960 | White | 106—15 |
| 2,955,945 | 11/1960 | Emond | 106—15 |

ALEXANDER H. BRODMERKEL, *Primary Examiner.*

MORRIS LIEBMAN, *Examiner.*

J. B. EVANS, *Assistant Examiner.*